United States Patent [19]

Hulsing, II

[11] Patent Number: 5,243,278
[45] Date of Patent: Sep. 7, 1993

[54] DIFFERENTIAL ANGULAR VELOCITY SENSOR THAT IS SENSITIVE IN ONLY ONE DEGREE OF FREEDOM

[75] Inventor: Rand H. Hulsing, II, Redmond, Wash.

[73] Assignee: Sundstrand Corporation, Rockford, Ill.

[21] Appl. No.: 653,585

[22] Filed: Feb. 8, 1991

[51] Int. Cl.⁵ .............................. G01P 3/48; G01P 3/54
[52] U.S. Cl. .................................. 324/173; 324/207.22
[58] Field of Search ................. 324/173, 174, 207.15, 324/207.22, 207.25, 207.24; 73/505, 517 A

[56] References Cited

U.S. PATENT DOCUMENTS

| | | |
|---|---|---|
| 2,445,455 | 7/1948 | Rights . |
| 2,617,854 | 11/1952 | Van Valkenburg . |
| 2,697,214 | 12/1954 | Smith . |
| 2,700,758 | 1/1955 | Smith . |
| 2,989,711 | 6/1961 | Smith . |
| 3,005,969 | 10/1961 | Wysocki . |
| 3,060,370 | 10/1962 | Varterasian ................ 324/207.2 |
| 3,116,468 | 12/1963 | Perkins . |
| 3,137,812 | 6/1964 | Andresen . |
| 3,250,982 | 5/1966 | Bowie . |
| 3,477,027 | 11/1969 | Jablonski . |
| 3,600,669 | 8/1971 | McClain . |
| 3,646,537 | 2/1972 | Erspamer . |
| 4,013,911 | 3/1977 | Fujiwara . |
| 4,100,480 | 7/1978 | Lytle et al. .................... 324/173 |
| 4,109,200 | 8/1978 | McNulty . |
| 4,112,366 | 9/1978 | Kouril . |
| 4,372,173 | 2/1983 | EerNisse et al. . |
| 4,445,376 | 5/1984 | Merhav . |
| 4,467,651 | 8/1984 | Peters et al. . |
| 4,510,802 | 4/1985 | Peters . |
| 4,512,192 | 4/1985 | Peters . |
| 4,517,841 | 5/1985 | Peters et al. . |
| 4,522,062 | 6/1985 | Peters . |
| 4,541,105 | 9/1985 | Lee et al. . |
| 4,590,801 | 5/1986 | Merhav . |
| 4,591,795 | 5/1986 | McCorkle . |
| 4,592,233 | 6/1986 | Peters . |
| 4,628,735 | 12/1986 | Kirkpatrick . |
| 4,665,748 | 5/1987 | Peters . |
| 4,678,991 | 7/1987 | Schmidt . |
| 4,694,246 | 9/1987 | Avisse . |

(List continued on next page.)

FOREIGN PATENT DOCUMENTS

820921 12/1979 U.S.S.R. ........................ 324/207.15

OTHER PUBLICATIONS

Harry E. Burke Handbook of Magnetic Phenomena Van Nostrand Reinhold Co., New York 1986 p. 232.

Primary Examiner—Walter E. Snow
Attorney, Agent, or Firm—McAndrews, Held & Malloy, Ltd.

[57] ABSTRACT

The invention comprises a velocity sensor (10, 30, 50, 60, 70, 110) that measures velocity in only one degree of freedom and is insensitive to the other five degrees of freedom. The velocity sensor uses differential flux splitting, and by sensing changes in flux, common mode effects are removed. In practicing the invention, a permanent magnet (17, 33, 55, 65, 71, 131) is used to create a flux field, and multiple return paths are used to split the flux. A plurality of pole pieces (20-21, 39-40, 58-59, 66-67, 72-73, 111-112) simultaneously move an equal amount in relation to the return paths for differentially varying the amount of flux carried by each return path (13-14, 34-36, 52-53, 63-64, 73A-C and 75A-C, to thereby induce a differential voltage in secondary coils (15-16, 37-38, 56-57, 68-69, 80-83 and 90-93, 140-143 and 150-153). Detection means (not shown) is used to sense the change in voltage and provide an indication of the sensed velocity. The pole pieces and return paths are overlapped by an amount to ensure that one may move relative to the other a limited extent in directions not parallel to the sensitive axis without effecting a change in the net overlapped area, and the coils are arranged in series-connected, oppositely wound pairs so that common mode error signals are cancelled.

17 Claims, 7 Drawing Sheets

U.S. PATENTS DOCUMENTS

| | | |
|---|---|---|
| 4,706,259 | 11/1987 | Paros et al. . |
| 4,711,128 | 12/1987 | Boura . |
| 4,712,426 | 12/1987 | Peters . |
| 4,712,427 | 12/1987 | Peters . |
| 4,727,752 | 3/1988 | Peters . |
| 4,750,363 | 6/1988 | Norling . |
| 4,766,768 | 8/1988 | Norling . |
| 4,782,700 | 11/1988 | Hulsing . |
| 4,786,861 | 11/1988 | Hulsing . |
| 4,786,869 | 11/1988 | Kanai . |
| 4,799,385 | 1/1989 | Hulsing et al. . |
| 4,810,922 | 3/1989 | Hirsch . |
| 4,810,964 | 3/1989 | Granberg . |
| 4,811,602 | 3/1989 | Hulsing . |
| 4,814,680 | 3/1989 | Hulsing . |
| 4,821,572 | 4/1989 | Hulsing . |
| 4,848,156 | 7/1989 | Hulsing . |
| 4,864,861 | 9/1989 | Hulsing . |
| 4,870,588 | 9/1989 | Merhav . |
| 4,872,342 | 10/1989 | Hanson et al. . |
| 4,872,343 | 10/1989 | Peters . |
| 4,879,914 | 11/1989 | Norling . |
| 4,881,408 | 11/1989 | Hulsing et al. . |
| 4,882,933 | 11/1989 | Petersen et al. . |
| 4,891,982 | 1/1990 | Norling . |
| 4,891,984 | 1/1990 | Fujii et al. . |
| 4,896,268 | 1/1990 | MacGugan . |
| 4,901,586 | 2/1990 | Blake . |
| 4,912,990 | 4/1990 | Norling . |
| 4,918,277 | 4/1990 | Zimmer . |
| 4,920,801 | 5/1990 | Church . |
| 4,922,756 | 5/1990 | Henrion . |
| 4,928,203 | 5/1990 | Swindal et al. . |
| 4,930,351 | 6/1990 | Macy et al. . |

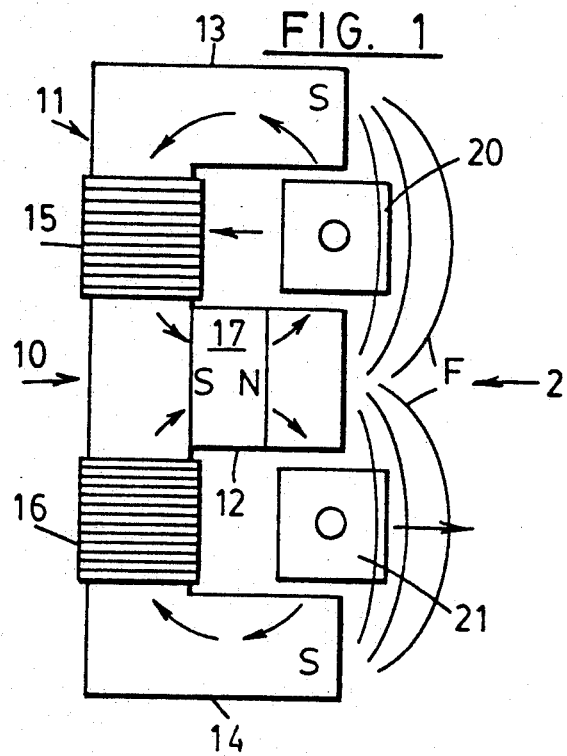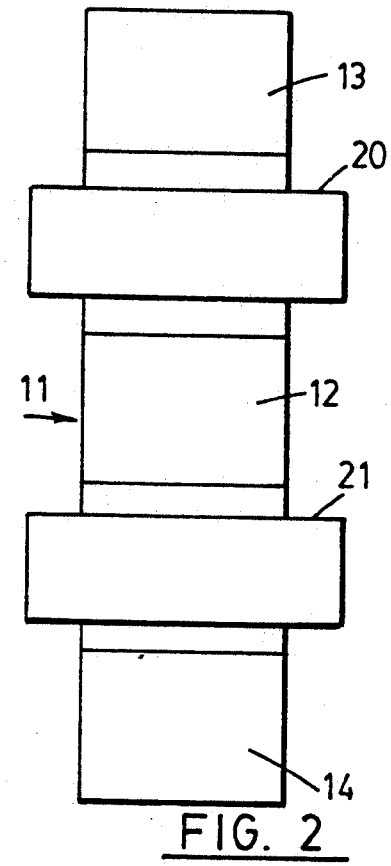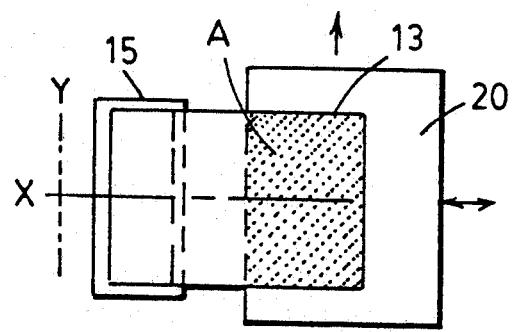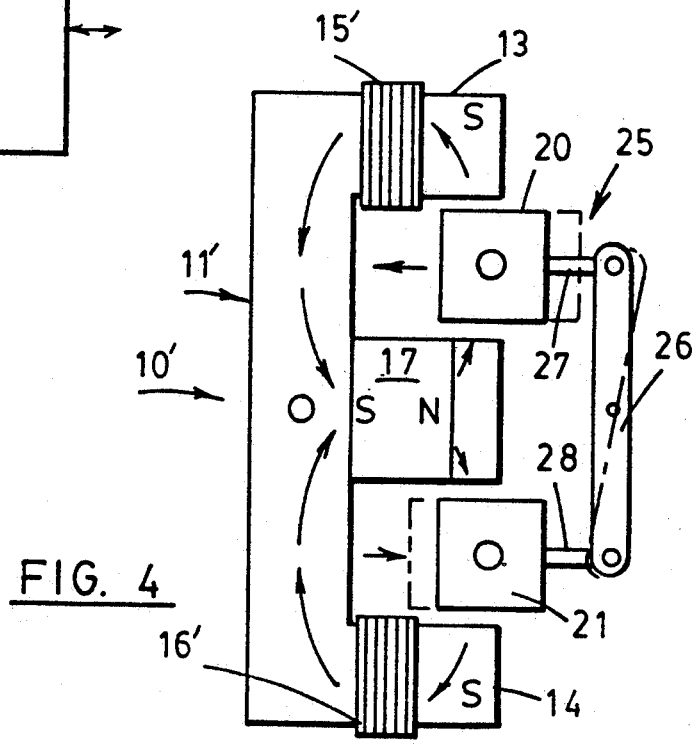
FIG. 1
FIG. 2
FIG. 3
FIG. 4

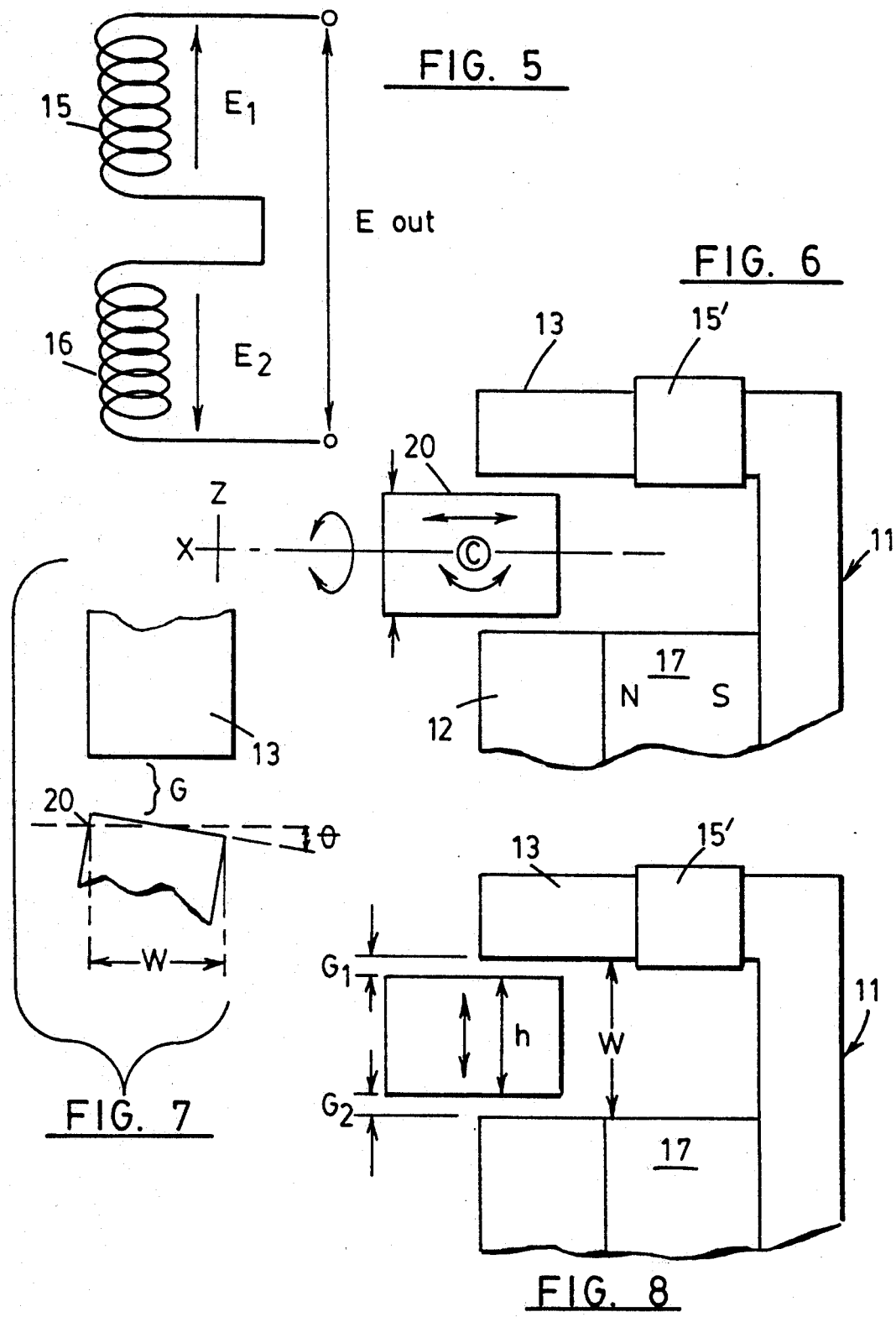

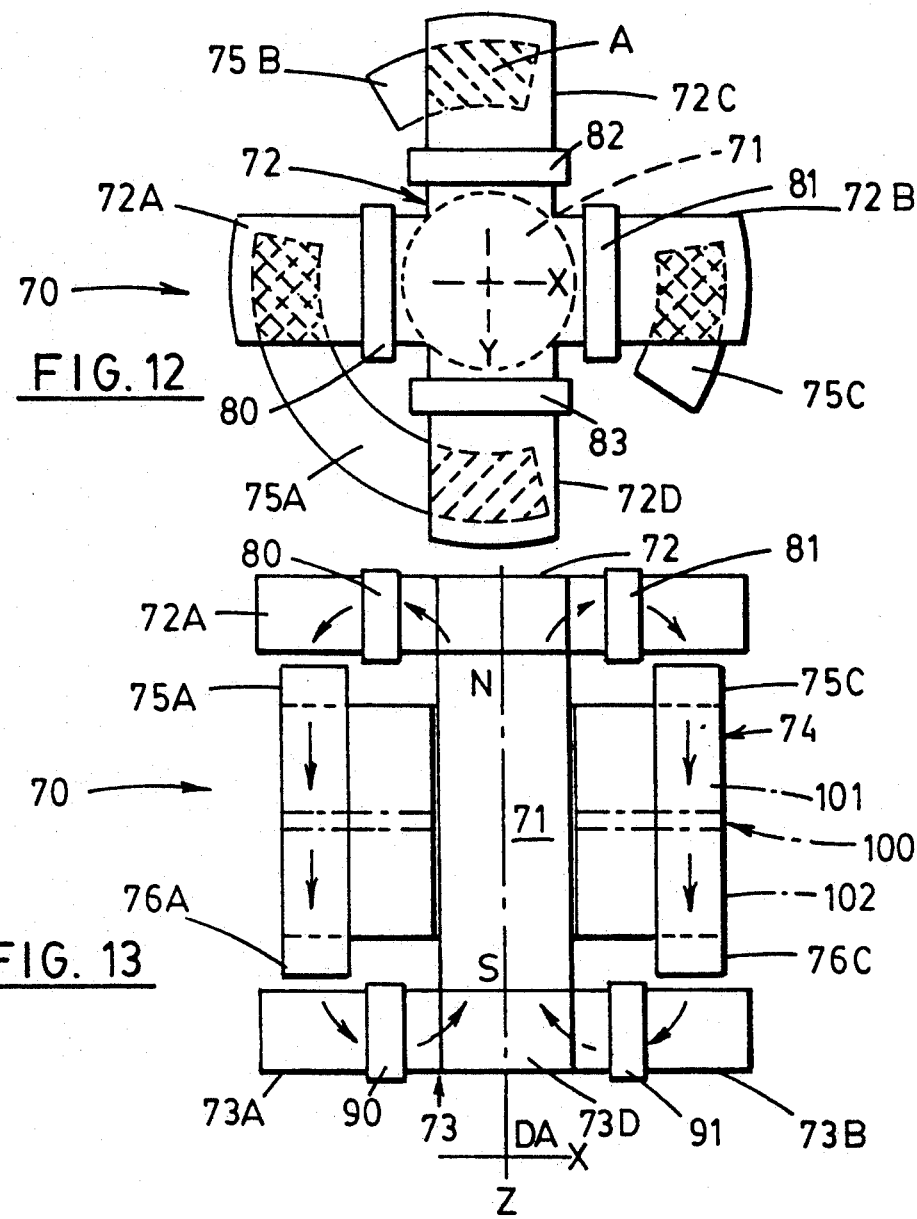
FIG. 12
FIG. 13
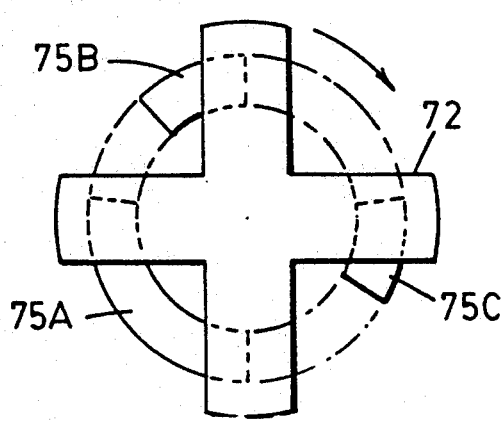
FIG. 14A
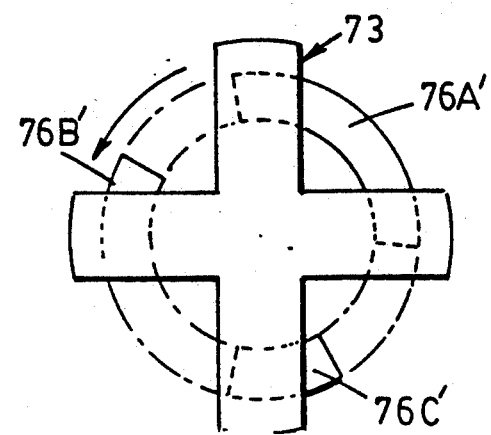
FIG. 14B

DIFFERENTIAL ANGULAR VELOCITY SENSOR THAT IS SENSITIVE IN ONLY ONE DEGREE OF FREEDOM

FIELD OF THE INVENTION

This invention relates generally to velocity sensing devices. More particularly, the invention detects velocity by measuring transient changes in total reluctance obtained through differential flux splitting.

CROSS REFERENCE TO RELATED APPLICATIONS

Reference is made to the following commonly assigned, copending applications:

(1) U.S. patent application Ser. No. 07/335,141, filed Apr. 7, 1989, entitled "Apparatus and Method for Sensing Displacement Using Variations In Magnetic Flux Linkage" now U.S. Pat. No. 5,066,911.

(2) U.S. Pat. No. 5,070,263, issued Dec. 3, 1989, entitled "Dual Rotor Torque Motor"; and (3) U.S. patent application Ser. No. 653,535, filed Feb. 8, 1991, entitled "Coriolis Inertial Rate and Acceleration Sensor" now U.S. Pat. No. 5,168,756.

BACKGROUND OF THE INVENTION

The use of devices which measure a change in reluctance for sensing or determining velocity are known in the prior art. In these devices, a pole piece is mounted for movement relative to a core. A magnet associated with the core produces a magnetic field, and the pole piece functions to carry the magnetic flux in a return path to the magnet. The pole piece is separated from the core by a very small gap, and as the pole piece moves relative to the core, it couples more or less flux through the return path and across the gap. This induces an electrical signal in a secondary coil, which is detected and converted into a velocity measurement. Since the flux is inversely proportional to the reluctance, and the reluctance is proportional to the area of overlap between the pole piece and core, divided by the gap, a decrease in the gap and/or an increase in the overlapped area will result in an increase in flux, and vice versa. A change in the gap or a change in the overlapped area will thus produce a signal that may be taken as representative of a change in velocity.

One of the problems associated with a conventional velocity sensor is its sensitivity to motion in more than one degree of freedom, thereby introducing error into the measurement.

Accurate sensing of angular rotation velocity relative to a base reference is particularly hard to achieve. Sensors currently in use for this purpose typically comprise a permanent magnet-resolver type of structure that requires bearings to support a shaft for rotation. These structures are delicate and expensive to build.

Accurate differential velocity sensing is even harder to achieve since it requires rotation of a shaft and a case, thus further adding to the complexity and expense of the structure.

In conventional velocity sensors, cross axis rotation of the pole piece relative to the core may cause a change in the gap, which results in a variation in the reluctance. This variation in reluctance is, in turn, erroneously sensed as a change in the velocity. In addition, translational movement of the pole piece relative to the core along an axis not intended to be a sensitive axis can cause a change in overlapped areas between the pole piece and core, thus producing a change in the reluctance.

One typical prior art velocity sensor comprises a single permanent magnet and a single coil. The problem with this design is that it usually consists of a round cylindrical shape with a permanent magnet positioned in the center of the coil. Detected flux changes occur mainly because the magnetic flux field is not uniform. If the coil is moved over the center of the magnet, the signal goes to zero because the gradient of the magnetic field goes to zero. This design does not achieve a differential measurement that is sensitive to motion in only one degree of freedom and insensitive to motion in the other five.

Applicant's above-referenced copending application Ser. No. 07/335,141 describes a position sensor that in a preferred embodiment comprises an E-shaped core 52 having a primary leg 56 and two secondary legs 58 and 60. A primary coil 54 is wound on the primary leg, and secondary coils 62 and 64 are wound, respectively, on the secondary legs. Energization of the primary coil produces an electromagnet which creates AC varying flux. Pole pieces 70 and 72 are movable in gaps between the primary leg and a respective secondary leg for controlling the amount of flux carried through each secondary leg and the amount of voltage consequently induced in its associated coil. The AC varying flux is generated at a constant frequency, and the amplitude of that frequency is measured to obtain a signal representative of the displacement or position. Stated differently, a differential displacement of the pole pieces produces a differential in the electrical signals, which corresponds to a change in position. The pole pieces and legs of the core are dimensioned so that one overlaps the other an extent to insure that relative displacement between them along axes about which motion is not intended to be sensed will not produce any differential flux. Additionally, the pole pieces are coupled together for equal but opposite motion whereby common mode errors are cancelled. This device is thus sensitive to motion only in the direction indicated by arrows 74. Several different embodiments are also disclosed, which function in essentially the same way to produce differential flux splitting and insensitivity to the other five degrees of freedom.

U.S. Pat. No. 5,070,265 describes a torque motor for driving a multi-axis angular rate sensor. The disclosed structure is very similar to the structure of a preferred embodiment described and claimed in the present application, but the claimed invention in that application is limited to details of the torque motor. In that application, a rate sensor 10 includes a permanent magnet 30 that is magnetically coupled to an upper rotor 18 and a lower rotor 44. At three circumferentially spaced locations, the upper rotor carries an axially projecting tab 60 which is centered between two electromagnetic coils 56, 58 carried by a base plate positioned between the upper and lower rotors. At corresponding circumferentially spaced locations, the lower rotor carries two axially projecting tabs 62 that extend adjacent opposite faces of the electromagnetic coils. When no electrical current is flowing through the electromagnetic coils, a plurality of flexures 46 that connect the upper and lower rotors provide a spring bias to maintain the tab 60 centered in a slot 66 and thus equidistant between each of the two tabs 62. When an electric current flows through the electromagnetic coils, distribution of the magnetic flux produced by the permanent magnet 30 changes so that the upper tab is attracted toward one of the electromagnetic coils and repelled away from the other. At the same time, the lower tabs are respectively repelled away from and attracted toward the opposite faces of the electromagnetic coils. The upper and lower rotors are thus dithered back and forth about a central axis each time the electromagnetic coil polarity changes due to a change in the direction of electrical current flowing through the coils. Flux from the magnet is carried through an upper pole piece 24 and thence through the rotors to a lower pole piece 32 and back to the magnet. This device thus provides a bi-directional, limited angle, reactionless torque motor for driving the rate sensor.

Copending application Ser. No. 07/653,535 describes a structure that is essentially the same as that described in U.S. Pat. No. 5,070,263, but which is directed to the angular rate and linear acceleration sensing aspects of the device. Return paths for the flux include raised steps on the upper and lower rotors, which are coupled together for equal but opposite rotation relative to one another. The dimensional relationships of the raised steps and pole pieces are such that the flux is differentially split between the pole pieces. This application is directed to the provision of accelerometers carried by the rotors, with means to sense angular rate and linear acceleration relative to three orthogonal axes, while eliminating or cancelling common mode errors.

None of the prior art devices known to applicant teaches means for measuring velocity in only a single degree of freedom, while rejecting the other five degrees of freedom. There is, therefore, need for a velocity sensor that is easy and economical to construct, reliable in operation and sensitive in only a single degree of freedom.

SUMMARY OF THE INVENTION

In accordance with the present invention, a highly accurate and inexpensive velocity sensor is provided. More particularly, the invention provides a velocity sensor that is sensitive in only a single degree of freedom. In one form, the velocity sensor measures linear velocity, and in another form it measures angular velocity. Variations of both the linear and angular velocity sensors are capable of sensing differential velocity.

The velocity sensor of the invention uses differential flux splitting techniques, and by sensing changes in flux it enables common mode errors to be eliminated.

For a limited amount of angular rotation or of translation, either differential or common mode, the velocity sensor of the invention can be constructed using a single permanent magnet, at least two pick-up or secondary coils, and two movable pole pieces or rotors defining return paths.

In the linear velocity sensor version, several different forms are possible. However, all have in common a core structured to define plural spaces, with a permanent magnet arranged to create lines of flux across the spaces, a pole piece movable in each space, defining return paths for carrying flux across the spaces, and a secondary or pick-up coil wound on the core for each pole piece. The pole pieces are coupled together for equal movement in unison, so that as one pole piece moves in its space to increase the amount of flux carried thereby, the other pole piece moves to decrease the amount of flux it carries, i.e., differentially splitting the flux. This change in flux induces a voltage in the secondary coils, which can be detected to provide a measure of velocity. By wiring the coils in a series but opposite sense, the opposite polarities add. Hence, if one pole piece moves in its space to carry more flux, a positive voltage is induced on the associated coil. At the same time, the other pole piece is moving an equal but opposite amount in its space, and a negative voltage is induced in its associated coil. The output is given by:

$$E_{out} = E_1 - E_2,$$

and the signals therefore add. Common mode motion of the pole pieces accordingly cancel, assuming that the coils are perfectly matched and that the changes in overlapped areas at each of the pole pieces are equal.

By overlapping the areas of the pole pieces and the associated return paths, the pole pieces can translate in a direction perpendicular to the sensitive axis without affecting the overlapped area and thus without affecting the flux carried through the return path. In addition, rotation about any axis (x, y or z) cancels to a first order since the reluctance in the gap remains constant.

An angular velocity sensor can be made to operate in essentially the same way, except that a change in angular position produces the flux split. In this form of the invention, upper and lower pole pieces are positioned on opposite sides of a core having a permanent magnet. A return path structure is mounted between the pole pieces, and has raised return path steps for cooperation with the pole pieces to define discrete paths for flow of flux. Series connected, oppositely wound coils are carried on the pole pieces for cooperation with the return path structures, whereby movement of the pole pieces and return path steps relative to one another about a sensitive axis produces a differential flux split between the pole pieces, and induces a voltage in the coils which can be detected to provide a measurement of velocity.

In one embodiment, the return path structure is defined by a pair of rotors that are caused to rotate in equal but opposite directions relative to one another about an axis coincident with the center of rotation of the rotors, and which is coaxial or parallel to the sensitive axis. The pole pieces have at least two diametrically opposed arms, and preferably four mutually perpendicular arms, with oppositely wound series-connected coils on opposed arms. The pole piece areas are made larger than the return path structures so that they overlap, and the upper and lower pole pieces are coupled together for equal but opposite rotation. Consequently, translational movement of the pole pieces and rotors relative to one another does not produce a net change in reluctance, and common mode error signals cancel. Similarly, motion in rotation about axes other than the sensitive axis is cancelled, and velocity is sensed in only a single degree of freedom.

The other five degrees of freedom comprise three degrees of linear motion of the pieces relative to one another, and two cross axes of rotation about the dither axis. The two cross axes errors are eliminated by measuring the flux split between the opposite arms of the counter-rotating upper and lower pole pieces. By having the coils wound in series but opposite relationship, the rotors and/or pole pieces can rotate in a cross axis direction, i.e., perpendicular to the dither axis, and there will not be any net change in reluctance.

Elimination of the three linear modes is accomplished by the use of the oppositely wound coils on opposed arms of the pole pieces, and by the overlapped areas of the pole pieces and return paths. Thus, if a pole piece is translated or moved laterally, the overlapped areas of two of the opposed pole piece arms will both increase (or decrease, depending upon the direction of motion). The result is that the flux carried by each return path will also increase (or decrease), and the coils on those arms will sense equal amounts of increased (or decreased) flux. However, since they are wound in series but opposite sense, the signals cancel. The area of the pole piece relative to the return path is great enough so that the overlapped areas do not change on the other two arms during this translational movement and there is no net change in flux carried through those associated return paths.

BRIEF DESCRIPTION OF THE DRAWINGS

The foregoing advantages, as well as other objects and advantages of the invention, will become apparent from the following detailed description when considered in conjunction with the accompanying drawings, wherein like reference characters designate like parts throughout the several views, and wherein:

FIG. 1 is a somewhat schematic view in side elevation of a preferred form of linear velocity sensor according to the invention;

FIG. 2 is a front view in elevation of the device of figure 1, looking in the direction of the arrow 2;

FIG. 3 is a top plan view of the device of FIGS. 1 and 2;

FIG. 4 is a somewhat schematic view in side elevation, similar to FIG. 1, but showing the coils disposed on the legs of the E-shaped core, and showing one way in which the pole pieces may be coupled together for equal but opposite motion;

FIG. 5 is a schematic view of how the coils on the core are wound in series but opposite relationship;

FIG. 6 is an enlarged schematic view depicting various ways in which a pole piece may move in relation to the core;

FIG. 7 is an enlarged, fragmentary schematic view of FIG. 6, as seen from the left-hand side of that figure;

FIG. 8 is a schematic view similar to FIG. 6, showing the relationship between the pole piece and the space between the primary and secondary leg of the core, and illustrating how the gaps are defined between the pole piece and legs;

FIG. 12 is a somewhat schematic top plan view of one form of angular velocity sensor in accordance with the invention;

FIG. 13 is a schematic side view in elevation of the angular velocity sensor of FIG. 12;

FIG. 14A is a schematic view looking down on the upper pole piece and associated return path rotor of a modified angular velocity sensor that is capable of differential velocity sensing;

FIG. 14B is a schematic view looking down on the lower pole piece and associated return path rotor of the device of figure 14A;

DETAILED DESCRIPTION OF THE PREFERRED EMBODIMENTS

Figure 9:
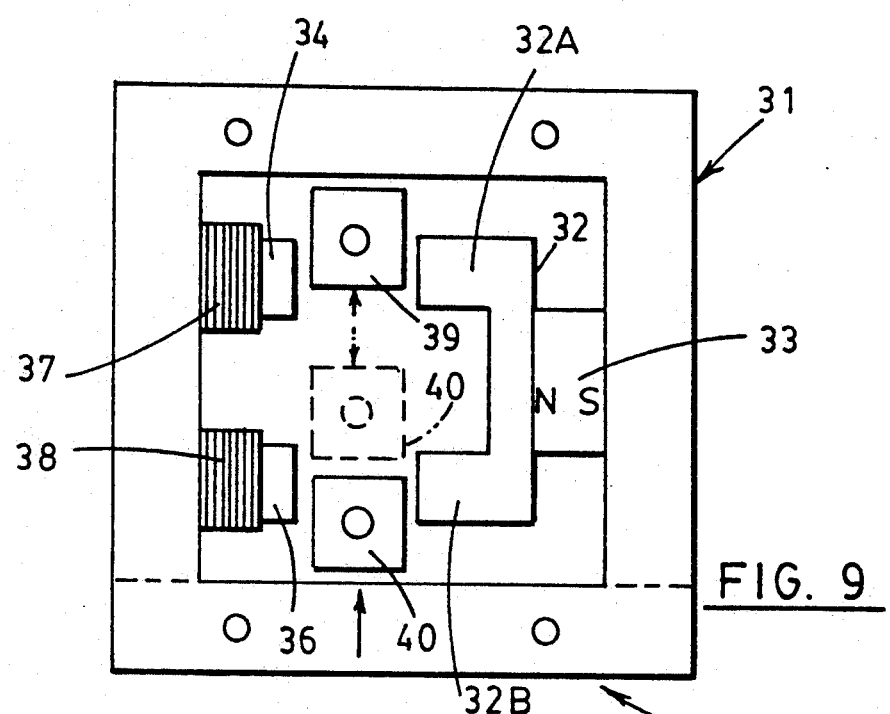
FIG. 9 is a schematic view of an alternate embodiment of the linear velocity sensor, in which a fork frame is employed.

Referring more particularly to the drawings, a first form of linear velocity sensor is indicated generally at 10 in FIGS. 1-8. This sensor comprises an E-core 11 having a center leg 12 and opposite end legs 13 and 14, with the center leg serving as a primary leg and the two end legs serving as secondary legs. A first coil 15 is wound on the core between the center leg and one of the end legs 13, and a second coil 16 is wound on the core between the center leg and the other end leg 14. The coils are preferably wound in opposite directions and connected in series (see FIG. 5).

The center leg 12 at least partially comprises a permanent magnet 17, with one pole "S" disposed adjacent the spine of the core, and the other pole "N" oriented toward the outer, free end of the center leg. The two end legs and the spine of the core thus have the same polarity ("S", in the example shown) as that end of the magnet oriented toward the core.

First and second pole pieces 20 and 21 of ferromagnetic material are movably positioned in the spaces defined between the center and end legs, respectively, and define return paths for carrying flux "F" from the magnet, through the core and back to the magnet. The total flux, $\phi$, is constant for symmetrical in-out motion of the two pole pieces, i.e., when one pole piece 20 moves in (or to the left as viewed in FIG. 1) and the other pole piece 21 moves out (or to the right as viewed in FIG. 1), more flux is caused to flow in the upper leg, and less in the lower leg. This change in reluctance between the upper and lower legs, caused by the change in position of the pole pieces, induces a positive voltage in coil 15 and an equal but negative voltage in coil 16. Since the coils are wired in an opposite sense, the opposite polarities add ($E_{out}=E_1-E_2$). Common mode motion of the pole pieces therefore cancel, assuming that the coils are matched and that equal changes in overlapped area "A" occur between the two pole pieces and the associated portions of the core (legs 13 and 14).

Essentially, the device measures differential flux split between the two pole pieces. Since the flux is inversely proportional to the reluctance, and the reluctance is proportional to the quotient of the gap "G" between the pole piece and core divided by the area of overlap "A", a decrease in the gap or an increase in the area will result in an increase in flux. Without any means to compensate for this phenomenon, misalignment between the pole piece and core, or translational or rotational motion of one relative to the other about axes other than the sensitive axis will produce an error signal.

In the present invention, these error signals are eliminated by oppositely wiring the secondary coils in series, and by overlapping the areas of the pole pieces and associated core portions (legs 13 and 14) so that the limited motion permitted by the structure will not produce any net change in the overlapped areas when one moves relative to the other along any axis other than the sensitive axis. Relative rotational movement between the pole piece and core could cause a change in the gap (see FIG. 6), but the oppositely wound, series-connected coils and counter-moving pole pieces result in cancellation of error signals due to this type of aberrational motion. Rotation about any axis (x, y or z) cancels to a first order since the reluctance in the gap remains constant.

$$R = G/A = [G_{(avg)}/A] \cdot \cos \theta$$

Rotation about the "Z" axis does not change the average overlapped area. In addition, translation along the "Z" axis produces cancelling reluctance changes since:

$$R_{total}32\ G_1A + G_2/A$$

and $$(W-h) = 2G_{(avg)} = constant = G_1 + G_2$$

therefore $$R_{total} = (W-h)/A = constant.$$

It should be noted that there is a single degree of angular sensitivity in the E-core linear velocity sensor when the two pole pieces are stationary and the core is rotated. In this event, the two pole pieces move in and out of their respective spaces and this motion can be sensed as an angular velocity change.

In FIG. 4, a type of linkage is shown at 25 which might be suitable for coupling the two pole pieces 20 and 21 together for equal but opposite motion. This, in essence, comprises a pivot link 26 connected through arms 27 and 28 with the respective pole pieces. In addition, the coils 15' and 16' are shown disposed on the legs 13 and 14 rather than on the spine of the E-core as in the previously described form of the invention. In all other respects, this form of the invention functions identically to that previously described and illustrated.

A different embodiment of the linear velocity sensor is shown at 30 in FIG. 9. In this form of the invention, the core comprises a rectangular frame 31 having a forked member 32 supported from one side on a permanent magnet 33, with the ends 32a and 32b of the fork positioned in spaced alignment with a pair of secondary legs 34 and 36 extending inwardly from the other side of the frame. Secondary coils 37 and 38 are wound, respectively, on the legs 34 and 36 and produce an electrical signal in response to the proportion of total flux which passes through the respective legs from the magnet 33. The proportion of flux passing through each leg is determined by the position of pole pieces 39 and 40 which are mounted for equal but opposite motion in the space between the fork and the legs. As one pole piece moves farther into a gap or space, the other moves farther out, varying the distribution of flux in each of the legs. Alternatively, the pole pieces could move in the same direction, so long as they are arranged to simultaneously increase and decrease the amounts of flux carried by the respective legs. Moreover, one side of the core could be removed, as indicated by dot-and-dash lines, without adversely affecting the performance of the device.

Figure 10:
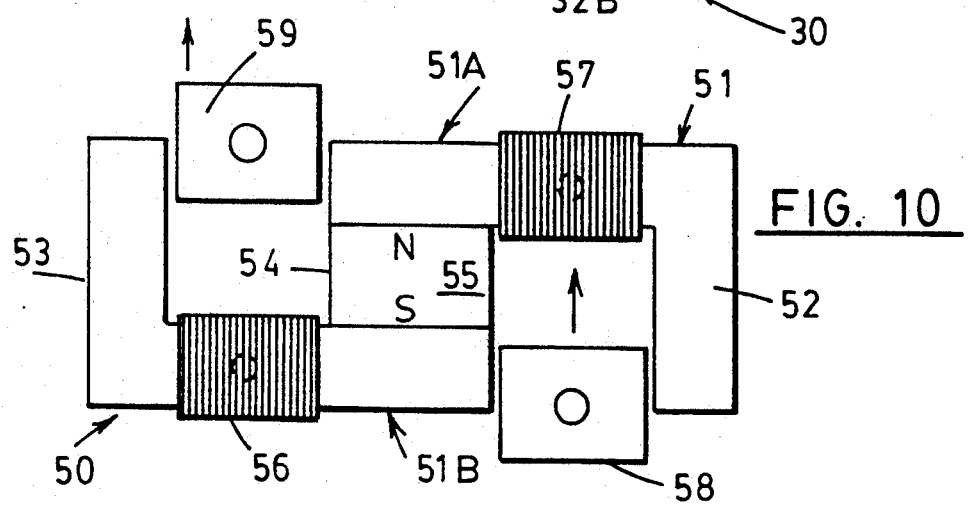
FIG. 10 is a schematic view of a further alternate embodiment of the linear velocity sensor, in which an S-shaped core is employed.

A third embodiment of the sensor according to the invention is shown at 50 in FIG. 10. Sensor 50 includes an S-shaped core 51, which may optionally comprise two L-shaped cores 51A and 51B, connected so that they face in opposite directions. The opposite ends of the S-shaped core 51 define secondary legs 52 and 53, and the center portion of the core comprises a primary leg 54 including a permanent magnet 55. Secondary coils 56 and 57 are wound on the portions of each core section extending between the primary leg and the secondary legs, respectively. The primary leg is spaced from the secondary legs, defining gaps in which first and second pole pieces 58 and 59 are mounted for equal but opposite movement to vary the amount of flux carried by the respective legs.

Another embodiment of the sensor according to the invention is represented generally at 60 in figure This sensor comprises an H-core 61 with a primary leg 62 connected to two oppositely extending secondary legs 63 and 64. The primary leg is double-ended and has two opposite end portions 62A and 62B extending parallel to the secondary legs and spaced therefrom. A permanent magnet 65 connects the primary leg with the secondary legs, and has one pole (N) oriented adjacent the primary leg and the other pole (S) oriented adjacent the secondary legs. A pair of pole pieces 66 and 67 are movably positioned in the spaces or gaps defined between the primary and secondary legs, and are coupled together for movement in unison. Coils 68 and 69 are wound on the secondary legs 63 and 64 in a manner identical to that described in connection with the previous forms of the invention. This form of the invention is useful for detecting displacement of the pole pieces 66 and 67 in the same direction, as indicated by the arrows. As is apparent from an inspection of FIG. 11, movement of one pole piece into its associated space is accompanied by corresponding movement of the other pole piece out of its associated space.

Figure 11:
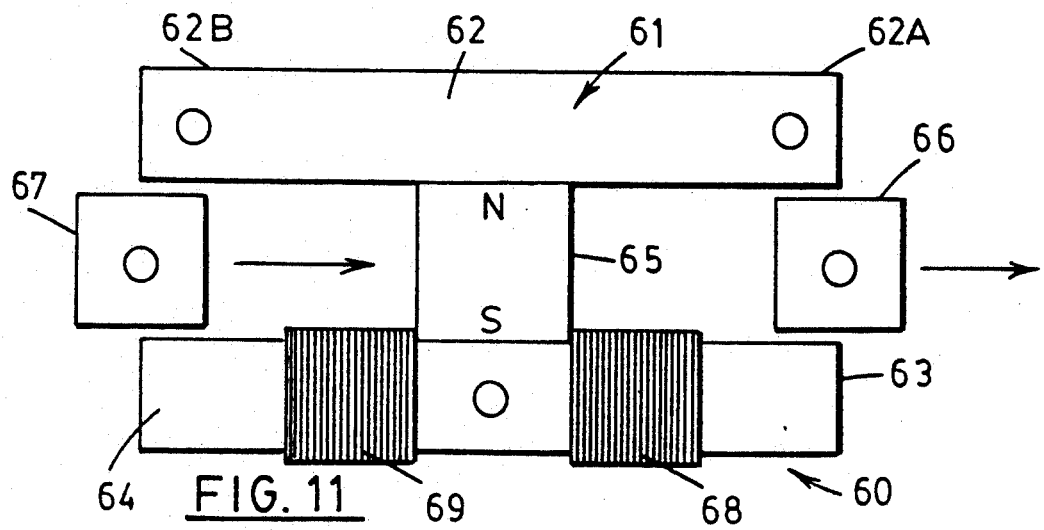
FIG. 11 is a schematic view of a still further alternate embodiment of the linear velocity sensor, in which an H-shaped core is employed.
Figure 15:
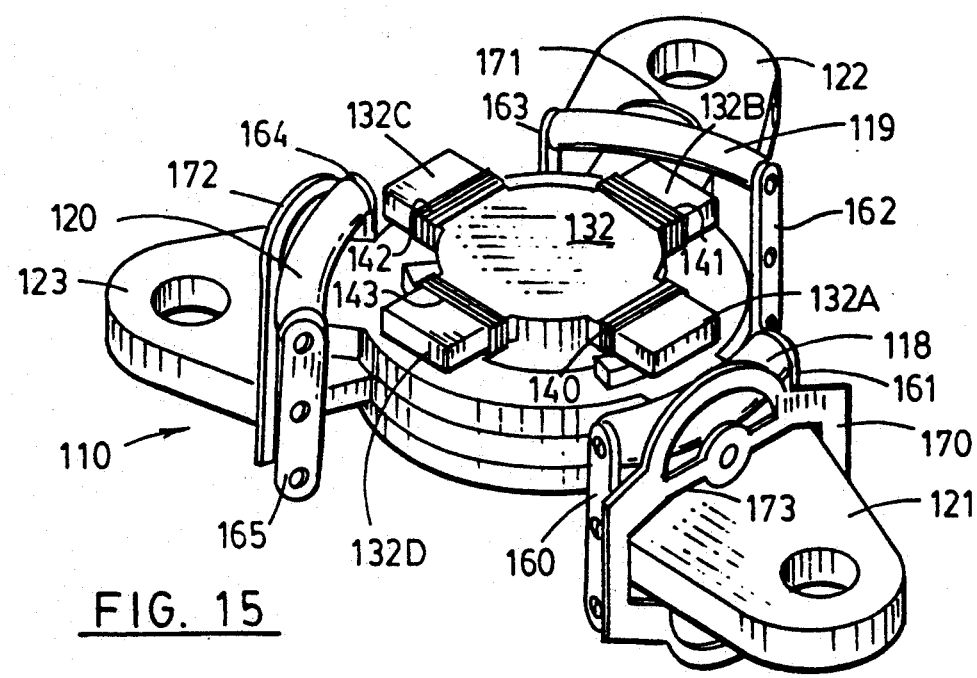
FIG. 15 is a top perspective view of one type of construction which may be used to employ the principles of the angular velocity sensor schematically depicted in FIGS. 12—14.

If the two pole pieces in the forms of the invention illustrated in FIGS. 9, 10 and 11 are fastened together to form a unitary structure or single part, the devices would function as a single direction velocity sensor and would no longer be differential. In any event, all of the forms of the invention described would be insensitive to all degrees of freedom other than that in which motion is to be sensed.

The output voltage for the invention thus described is given as:

$$E_{out} = -d\phi/dt,$$

where $\phi$ is the flux. For example, using an AlNiCo 5 magnet with a 200 turn secondary coil and a 0.25 cm square overlapping pole face operating with a 100 Hz sine vibration, the resulting voltage for a 0.05 cm peak motion is:

$$E = -(B_{total}/2) \cdot A \cdot w \cdot (\Delta d/d) \times 10^{-4} \times N$$

where:
B = the Gauss field
A = the overlapped area
w = $2\pi$·frequency

Δd/d = % change in area
N = number of turns $$E_{out} = -(B_{total}/2) \cdot A \cdot w \cdot (\Delta d/d) \times 10^{-4} \times N$$

$$= -[(8 \times 10^3 \text{ gauss}/2) (.25 \times 10^{-2})^2 \text{ meters}] \times$$

$$2\pi \text{ 100 rad/sec} \times (.05 \text{ cm}/.25 \text{ cm}) \times$$

$$10^{-4} \text{ (webers/m}^2\text{)/gauss} \times 200 \text{ turns}$$

$$= -4 \times 10^3 \times .625 \times 10^{-5} \times 6.28 \times 10^2 \times$$

$$.2 \times 10^{-4} \times 2 \times 10^2$$

$$= -62.8 \text{ mv/per coil}$$

The series coils would put out 126 mv/20 milli-inch/1.6 msec, or 6.3 volts/in/0.0016 sec 10 mv/in/sec. This is a good signal strength considering operational amplifiers can have less than 5 nv/$\sqrt{Hz}$ noise. For a 1000 Hz band width, the signal to noise ratio, S/N, would be:

$$S/N = 126 \text{ mv}/[(5 \text{ nv}/\sqrt{Hz})(\sqrt{1000 \text{ Hz}})] = 8 \times 10^5,$$
or ≈ 120 db, where:
resolution = 15 μ inches/sec, or < 1 light band per second.

With reference to FIGS. 3, 6, 7 and 8, the pole piece can translate along the "y" axis without affecting the face area (overlapped area). Motion along the "x" axis is sensed differentially (common mode cancels by coil matching).

Further, rotation about any of the axes "x", "y" or "z" cancels to a first order since the reluctance in the gap remains fixed, e.g. R = g/area = (cos θ)·(gap$_{avg}$)/area. Rotation about the "z" axis does not change the average face area. Also, translation along the "z" axis produces cancelling reluctance changes, e.g., R$_{total}$ = G$_1$/A + G$_2$/A; (w−h) = 2G$_{avg}$ = constant; therefore R$_{total}$ = (w−h)/2 = constant.

An angular velocity sensor is indicated generally at 70 in FIGS. 12-14. This angular velocity sensor has all of the advantages of the linear versions described above, and the principle of operation is essentially the same as that for the linear versions. Sensor 70 comprises a permanent magnet 71 having a first X-shaped pole piece 72 secured at one pole (N) and a second X-shaped pole piece 73 secured at the other pole (S). As seen best in FIG. 12, pole piece 72 has four arms 72A, 72B, 72C and 72D projecting radially at 90° intervals relatively to one another. Pole piece 73 similarly has four radially projecting arms 73A, 73B, 73C and 73D extending parallel to and in vertical alignment with the arms of pole piece 72.

A rotor 74 is rotatably positioned on the magnet between the pole pieces for rotating motion relative to the pole pieces. Rotor 74 has a plurality of raised return path steps 75A, 75B and 75C extending into proximity with pole piece 72; and a plurality of corresponding raised return path steps 76A, 76B and 76C extending into proximity with pole piece 73.

Secondary coils 80, 81 82 and 83 are wound on respective arms of pole piece 72, and identical coils 90, 91, 92 and 93 are wound on respective arms of pole piece 73. Those coils 80, 81 or 82, 83, etc., that are wound on diametrically opposite arms are connected in series and are oppositely wound, as schematically depicted in FIG. 5.

When the rotor is caused to rotate relative to the pole pieces, the overlapped areas "A" of the raised return path steps of the pole pieces and associated arms change, thereby changing the amount of flux from the magnet that is carried by the associated arm. This, in turn, changes the voltage induced in the associated coil and produces a signal representative of the velocity of rotation about the central or dither axis "DA" of the device.

In operation, a relative rotational change between the pole pieces and rotor produces a flux split between the overlapped areas, one of which is increasing while the other is decreasing in each opposed pair of raised return path steps and associated pole piece arms. Translation of the rotor relative to the pole piece along the X-axis does not produce any change in the flux split between arms 72A and 72B because the areas of overlap do not change, as seen in FIG. 12. Likewise, this movement does not produce any flux split in the two remaining overlapped areas since the areas on the opposed arms 72C and 72D are both either increasing or decreasing at the same time. Since the coils 82 and 83 are oppositely wired, the induced voltages match and cancel one another.

Motion in rotation about the X- or Y-axes also cancel. Since the coils are wired in series pairs 80-81, 82-83, 90-91, etc., rotation about the Y-axis will produce complementary flux splits in coil pairs 80-81 and 90-91. For example, as raised return path step 75A and arm 72A and its associated coil 80 approach one another, the gap between them narrows, increasing the flux carried by arm 72A. At the same time, the raised return path step 76A and its associated arm 73A and coil 90 are moving away from one another, increasing the gap between them and decreasing the amount of flux carried by arm 73A.

Linear motion along the Z-axis is also cancelled as a common mode effect (induced voltage on both coils of a coil pair on the same pole piece decrease), and to a first order the flux in the closed circuit remains constant.

Rotation about the Z-axis, however, will cause a change in the overlapped areas, producing a differential flux split which induces a voltage in the coils that is sensed to obtain a measure of angular velocity about the Z-axis.

A differential velocity sensor 100 can be made by splitting the rotor 74 into an upper part 101 and a lower part 102, as indicated by the dot-and-dash lines in FIG. 13, and counter-rotating the halves. In this structure, the raised return path steps 76A', 76B' and 76C' on the lower rotor are diametrically reversed from those on the upper rotor, as seen in FIGS. 14A and 14B. This variation has all of the advantages of the form of the invention previously described, but promotes differential velocity sensing. The scale factor is four times that of the E-core version, or about 0.5 volts peak for 4° relative rotation at 100 Hz.

A more detailed illustration of an operative embodiment of the angular differential velocity sensor is shown at 110 in FIGS. 15-21. The structure shown is substantially identical to the structure described in copending application U.S. Pat. Nos. 5,168,756 and 5,070,263, except that the accelerometers and their mounting structures as provided in those applications are omitted herein. Those applications are referred to and incorporated herein by reference for their teaching of a suitable structure for coupling the rotors together and for their teaching of a suitable reactionless dither drive for counter-rotating the rotors. A brief description will be provided herein for an understanding of the invention, but greater detail can be obtained by referring to said copending applications.

The sensor 110 comprises first and second rotors 111 and 112 made of magnetic material and mounted on opposite sides of a stationary base plate 113 made of a non-magnetic material, for counter-rotating oscillation about a dither axis DA coincident with the longitudinal center line of the base plate and rotors.

Each rotor comprises a ring-shaped annulus 114 with a plurality (three, in the example shown) of raised return path steps 115, 116 and 117 on the surface thereof opposite the base plate. As seen best in FIGS. 16 and 17, one of the return path steps, 115, has an arcuate length substantially greater than the length of the other two return path steps, although this return path step could be divided into two steps, if desired.

Three radially projecting flexure mounting blocks 118, 119 and 120 are spaced equidistantly around the circumference of each rotor, and each includes opposite ends disposed in alignment with the opposite ends of the corresponding flexure mounting block on the opposite rotor.

The base plate 113 has three radially projecting arms 121, 122 and 123 spaced equidistantly around its circumference, for mounting the device to a support structure, and for connecting the rotors to the base plate. Each arm has three uniformly spaced slotted openings 124, 125 and 126 therethrough, lying generally in planes radial to the center of the base plate, and dither drive torque coils 127 and 128 are mounted in slots 129, 130 formed in that portion of the arms extending between the slotted openings 124-126. These coils are oppositely wound so that their north and south poles are in opposed relationship to one another.

A permanent magnet 131 is mounted in the center of the base plate, and extends at its north and south poles at least partially into the central opening of a respective rotor 111 and 112.

First and second X-shaped pole pieces 132 and 133 of magnetic material are fixed at opposite ends of the magnet, in overlying relationship to the rotors 111 and 112. Each pole piece includes four radially projecting arms 132A-132B-132C-132D, and 133A-133B-133C-1330, respectively, extending in closely adjacent, overlying relationship to a respective one of the raised return path steps on the adjacent rotors (see FIG. 16). Series-connected, oppositely wound coils 140-143 and 150-153 are wound on the arms in the manner described in connection with the form of invention shown in FIGS. 12 and 13, and the rotors, pole pieces and magnet function in essentially the same way as described in relation to FIGS. 12 and 13.

Figure 16:
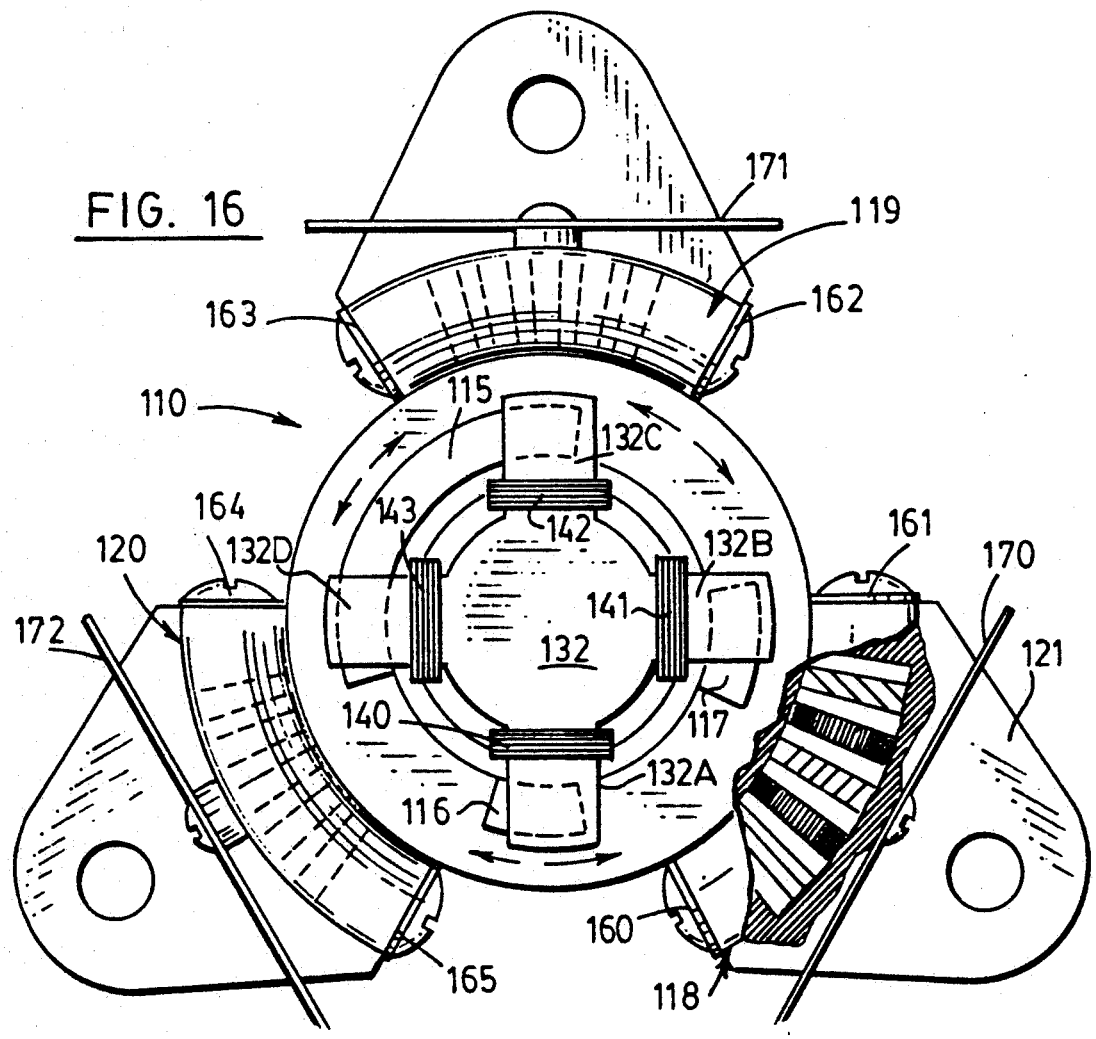
FIG. 16 is a top plan view of the device of FIG. 15.
Figure 17:
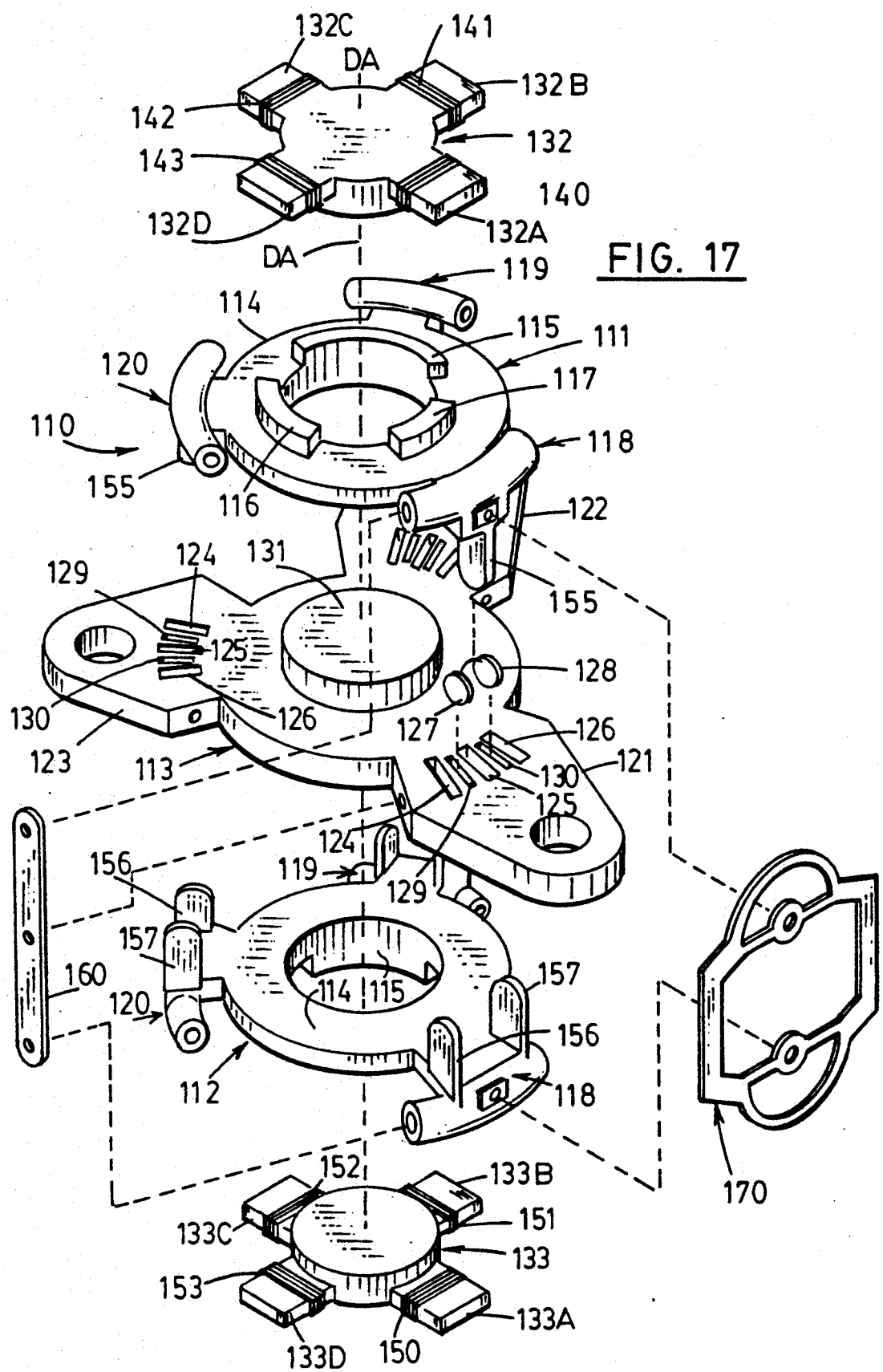
FIG. 17 is an exploded, perspective view of the device of FIGS. 15 and 16.
Figure 18:
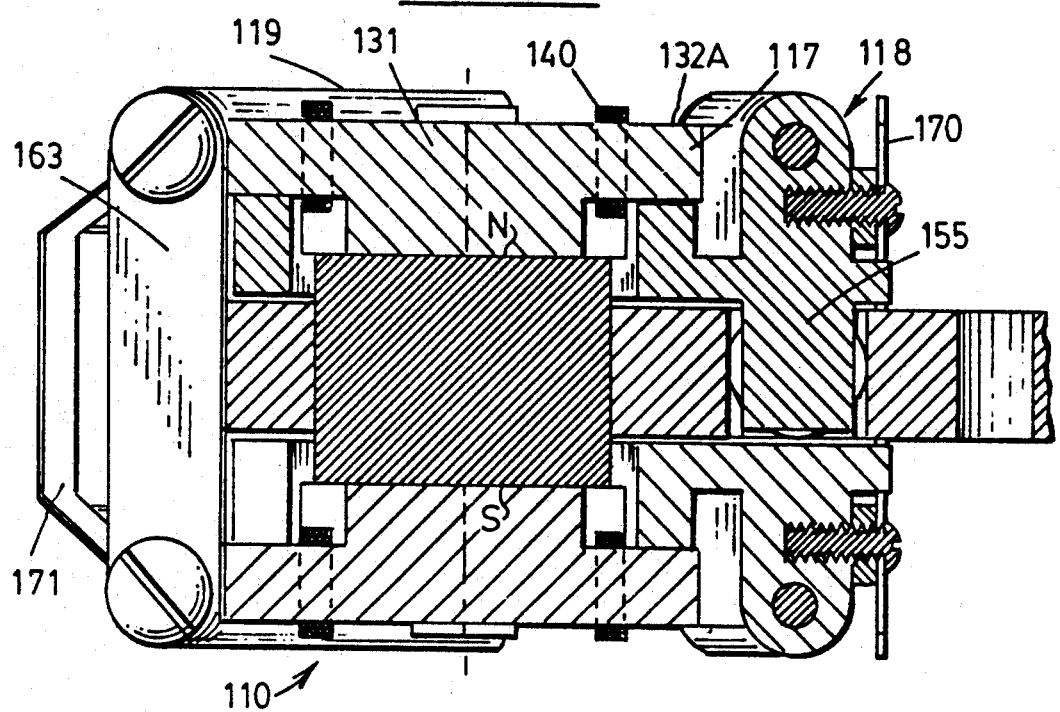
FIG. 18 is an enlarged, longitudinal sectional view of the device of FIG. 15-17, taken along the line 18—18 in line 16.
Figure 19:
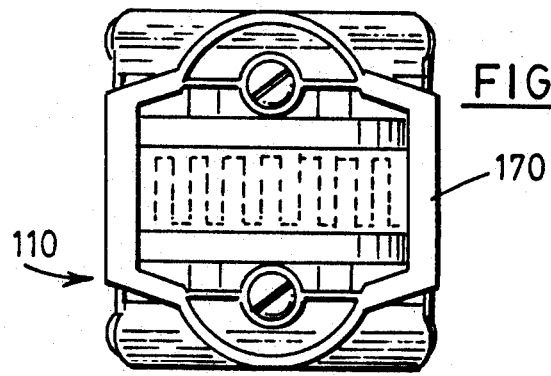
FIG. 19 is a side view in elevation of the device of FIGS. 15-18, showing one of the links used to couple the rotors together, with the link shown in an at-rest position.

As seen best in FIGS. 16, 17 and 18, the upper rotor 111 includes an axially projecting armature blade 155 extending from each flexure mounting block into the center slotted opening 125 in each arm of the base plate, and thus between the torque coils 127 and 128. Lower rotor 112 includes a pair of spaced armature blades 156 and 157 projecting axially from each flexure mounting block into respective slotted openings 124 and 126 in the arms of the base plate, and thus on the side of torque coils 127 and 128 opposite to that on which armature blades 155 are disposed. Application of a sinusoidally alternating electric current to the torque coils causes armatures 156 on the lower rotor 112 to first be attracted to coils 127, while armatures 157 are simultaneously repelled by coils 128 and armatures 155 on the upper rotor are simultaneously attracted to coils 127 and repelled by coils 128 during a first half cycle of the energizing current. During the next half cycle, the opposite effect is achieved and the rotors thus oscillate or dither back and forth about the dither axis.

The rotors 111 and 112 are held in operative relationship to one another and to the base plate by a plurality of elongate, flat, spring-like flexures 160-165 secured at their opposite ends to respective ends of the flexure mounting blocks, and secured intermediate their ends to the sides of the arms 121-123 on the base plate, such that the flexures each lie in a plane radial to the dither axis. In the specific example illustrated, two such flexures are secured on each mounting block and associated base plate mounting arm, whereby a total of six such flexures are provided. The flexures have a natural frequency that is near the drive frequency of the dither drive, and define magnetic gaps and spacing between the armatures and torque coils 127 and 128. They also ensure that the rotors move only in the dither directions and prevent axial displacement of the rotors.

Figure 20:
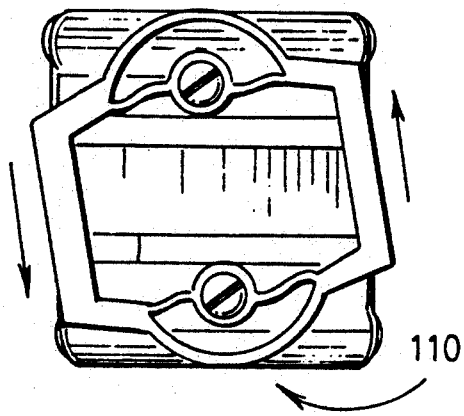
FIG. 20 is a view similar to FIG. 19, showing the link in a position flexed to one side.
Figure 21:
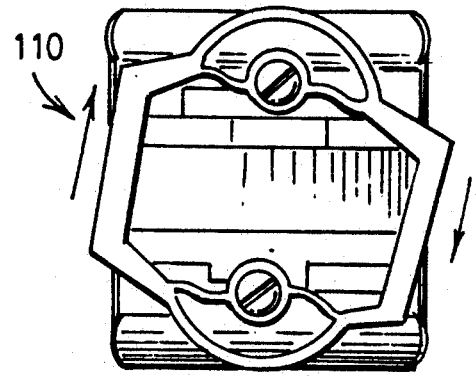
FIG. 21 is a view similar to FIG. 20, showing the link flexed to the other side.

If only the flexures 160-165 were provided to connect the rotors to one another and to the base plate, it is possible that external vibration or other external forces might cause the rotors to dither or counter-rotate out of synchronization with one another. Accordingly, links 170, 171 and 172 are connected via cross flexures 173 at their opposite ends with each rotor. As shown in FIGS. 20 and 21, when the rotors are caused to rotate in opposite directions relative to one another, these cross flexures 173 bend in an "S" shape and cause each rotor to rotate with an equal but opposite motion. External vibration or other unwanted forces acting on the rotors are thus compensated.

For a limited angle of rotation, or limited translation in either differential or common mode, a velocity sensor in accordance with the various forms of invention described herein can be constructed using a single magnet, at least two pick-up or secondary coils, and two relatively movable pole pieces or return paths. Such a device would: measure a velocity in one degree of freedom while rejecting the other five degrees of freedom; obtain a good signal to noise ratio; be relatively simple and low cost in construction; be supported for movement without the need for bearings or other complicated and expensive structure, with reasonable gaps of from 0.1 to 1.0 mm.; have good linearity—on the order of 0.1% or better, depending upon the geometry, range and fringing effects; have good resolution, i.e., less than one light band per second or 2.5 arc second per second; not require rotation or other motion of wires, magnet and coil supports, having as the only moving parts the relatively light pole pieces or rotors; and be easily adapted to other geometries using flux splitting and dual (constant) gap.

In a preferred construction, the overlapped area between the pole piece and its associated return path is approximately two and one half times as great as the gap between them. Thus, for a ten mil gap, the overlapped area would be 25 mils. This relationship minimizes the effect of the "fringing field", that is, the area in the flux field where the intensity or strength of the flux becomes significantly weak. The fringing field falls off very rapidly, being proportional to one over the distance cubed, or one over the gap cubed, so that within a distance equal to about one half the gap, the overlapped area takes up most of the fringing field, and any remaining fringe effects are miniscule. Additionally, the flux splitting feature of the invention means that while some of the fringing field is being added on one side of the overlapped area during relative movement between the pole piece and return path, it is being taken away on the other.

While the invention has been shown and described in detail, it is obvious that this invention is not to be considered as being limited to the exact form disclosed, and that changes in detail and construction may be made therein within the scope of the invention, without departing from the spirit thereof.

What is claimed is:

1. An angular velocity sensor comprising:
   means for generating a flux field;
   a first X-shaped pole piece disposed proximate a north pole of said means for generating a flux;
   a second X-shaped pole piece disposed proximate a south pole of said means for generating a flux, said first and second X-shaped pole pieces being in vertical alignment with one another;
   a rotor disposed between said first and second X-shaped pole pieces, said rotor having a plurality of return path steps, said return path steps being rotatable with respect to said first and second X-shaped pole pieces about a sensing axis, said return path steps and said first and second pole pieces forming multiple flux paths, arms of said first and second X-shaped pole pieces overlying and extending radially a distance beyond respective return path steps, said return path steps and said arms of said first and second pole pieces being dimensioned and positioned with respect to one another so that the magnitude of flux flowing through respective flux paths is sensitive to relative motion of said pole pieces and said return path steps about said sensing axis
   flux responsive means respectively associated with each of said multiple flux paths for generating a signal indicative of the rate of change of flux through the respective flux path thereby to indicate the angular velocity of the relative motion between said pole pieces and said return path steps about said sensing axis, said flux responsive means being generally insensitive to common mode motion of said rotor with respect to said pole pieces;
   whereby said angular velocity sensor is sensitive to angular velocity about said sensing axis while being generally insensitive to velocity in other degrees of freedom.

2. An angular velocity sensor as claimed in claim 1 wherein said flux responsive means comprises:
   a coil respectively wound about each of said arms of said first and second pole pieces, said coils being wound and interconnected with one another so as to generate a voltage indicative of sensed velocity in response to flux changes which occur when said rotor rotates with respect to said first and second pole pieces about said sensitive axis while generally cancelling any voltages which would otherwise result from flux changes occurring as a result of common mode motion of said rotor with respect to said pole pieces.

3. A differential angular velocity sensor comprising:
   a base plate;
   counter-rotating rotors positioned on opposite sides of said base plate and mounted for equal but opposite counter-rotation with respect to one another about a sensing axis, said rotors having raised return path steps formed thereon;
   means for generating a flux along said sensing axis;
   first and second pole pieces fixed at respective opposite poles of said means for generating a flux and on the side of the respective rotors opposite the base plate, each of said pole pieces having a plurality of radially projecting arms arranged in diametrically opposed pairs, each of said arms extending into overlying relationship with a respective one of the raised return path steps to form spaced flux return paths, said raised return path steps and said arms being dimensioned and positioned with respect to one another so as to result in a differential flux split between opposed pairs of said arms, each of said arms extending radially beyond the respective raised return path step, said arms of said first pole piece being in vertical alignment with said arms of said second pole piece;
   said counter-rotating rotors being rotatable about said sensing axis with respect to said first and second pole pieces;
   flux responsive means respectively associated with each of said multiple flux paths for generating a signal indicative of the rate of change of flux through the respective flux path thereby to indicate the angular velocity of the relative motion between said pole pieces and said return path steps about said sensing axis, said flux responsive means being generally insensitive to common mode motion of said rotors with respect to said pole pieces;
   whereby said differential angular velocity sensor is sensitive to differential angular velocity about said sensing axis while being generally insensitive to velocity in other degrees of freedom.

4. A differential angular velocity sensor as claimed in claim 3 and further comprising means for dithering said counter-rotating rotors about said sensing axis with respect to said first and second pole pieces.

5. A differential angular velocity sensor as claimed in claim 3, wherein said first and second pole pieces are X-shaped.

6. A differential angular velocity sensor as claimed in claim 3, wherein:
   the rotors are connected to each other and to the base plate by flexible means extending therebetween to limit relative movement of the rotors about said sensing axis.

7. A differential angular velocity sensor as claimed in claim 6 wherein:
   said flexible means comprises a plurality of elongate, spring-like flexures fixed at their opposite ends to the rotors and fixed intermediate their ends to the base plate, said flexures permitting rotational movement of the rotors relative to one another but generally preventing relative translational movement therebetween.

8. A differential angular velocity sensor as claimed in claim 7, wherein:
   said flexible means further includes a plurality of links connected between the rotors to permit said counter-rotating motion but to prevent axial displacement of one relative to the other.

9. A differential angular velocity sensor as claimed in claim 3 wherein said means for generating a flux comprises:

a magnet carried by said base plate and extending into proximity with said rotors at respective opposite poles of said magnet.

10. A differential angular velocity sensor as claimed in claim 3 wherein said flux responsive means comprises:
a coil respectively wound about each of said arms of said first and second pole pieces, said coils being wound and interconnected with one another so as to generate a voltage indicative of sensed velocity in response to flux changes which occur when said rotor rotates with respect to said first and second pole pieces about said sensitive axis while generally cancelling any voltages which would otherwise result from flux changes occurring as a result of common mode motion of said rotor with respect to said pole pieces.

11. A differential angular velocity sensor as claimed in claim 3, wherein said first and second pole pieces are X-shaped.

12. A differential angular velocity sensor comprising:
a base plate;
a counter-rotating rotors positioned on opposite sides of said base plate and mounted for equal but opposite counter-rotation with respect to one another, said rotors having raised return path steps formed thereon;
a magnet carried by said base plate and extending into proximity with said rotors at respective opposite poles of said magnet;
first and second pole pieces fixed at respective opposite poles of said magnet and on the side of the respective rotors opposite the base plate, each of said pole pieces having a plurality of radiallly projecting arms arranged in diametrically opposed pairs, each of said arms extending into overlying relationship with a respective one of the raised return path steps to form spaced flux return paths, said raised return paths steps and said arms being dimensioned and positioned with respect to one another so as to result in a differential flux split between opposed pairs of said arms, each of said arms extending radially beyond the respective raised return path step, said arms of said first pole piece being in vertical alignment with said arms of said second pole piece;
said counter-rotating rotors being rotatable abut a sensing axis with respect to said first and second pole pieces;
a coil respectively associated with each of said arms of said first and second pole pieces, said coils being wound and interconnected with one another so as to generate a voltage indicative of sensed differential velocity in response to differential flux changes which occur when said counter-rotating rotors rotate with respect to said first and second pole pieces about said sensitive axis while generally cancelling any voltages which would otherwise result from flux changes occurring as a result of common mode motion o said counter-rotating rotors with respect to said pole pieces;
whereby said differential angular velocity sensor is sensitive to differential angular velocity about said sensing axis while being generally insensitive to velocity in other degrees of freedom.

13. A differential angular velocity sensor as claimed in claim 12 and further comprising means for dithering said counter-rotating rotors about said sensing axis with respect to said first and second pole pieces.

14. A differential angular velocity sensor as claimed in claim 12, wherein said first and second pole pieces are X-shaped.

15. A differential angular velocity sensor as claimed in claim 12, wherein:
the rotors are connected to each other and to the base plate by flexible means extending therebetween to limit relative movement of the rotors about said sensing axis.

16. A differential angular velocity sensor as claimed in claim 15 wherein:
said flexible means comprises a plurality of elongate, spring-like flexures fixed at their opposite ends to the rotors and fixed intermediate their ends to the base plate, said flexures permitting rotational movement of the rotors relative to one another but generally preventing relative translational movement therebetween.

17. A differential angular velocity sensor as claimed in claim 16, wherein:
said flexible means further includes a plurality of links connected between the rotors to permit said counter-rotating motion but to prevent axial displacement of one relative to the other.

* * * * *